(12) United States Patent
Umezawa

(10) Patent No.: US 6,246,700 B1
(45) Date of Patent: *Jun. 12, 2001

(54) CLOCK SIGNAL SUPPLYING APPARATUS

(75) Inventor: Yoshiaki Umezawa, Tokyo (JP)

(73) Assignee: Oki Electric Industry Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/906,874

(22) Filed: Aug. 6, 1997

(30) Foreign Application Priority Data

Feb. 28, 1997 (JP) .................................... 9-046261

(51) Int. Cl.$^7$ ........................................ H04J 3/06
(52) U.S. Cl. ............................................ 370/503
(58) Field of Search .................. 370/366, 380, 370/388, 395, 503, 509, 510, 512, 514, 518

(56) References Cited

U.S. PATENT DOCUMENTS

| | | | |
|---|---|---|---|
| 4,956,839 | * 9/1990 | Torii et al. | 370/232 |
| 5,117,443 | 5/1992 | Shires . | |
| 5,331,667 | * 7/1994 | Izumi | 375/107 |
| 5,341,091 | * 8/1994 | Kurita | 324/750 |
| 5,463,663 | 10/1995 | Maruyama et al. . | |
| 5,574,753 | * 11/1996 | Vartti et al. | 375/357 |
| 5,590,116 | 12/1996 | Zhang . | |
| 5,752,012 | * 5/1998 | Smith | 713/600 |
| 5,844,891 | * 12/1998 | Cox | 370/235 |
| 5,859,846 | * 1/1999 | Kim et al. | 370/389 |
| 5,903,570 | * 5/1999 | Van Berkel | 370/503 |
| 5,987,620 | * 11/1999 | Tran | 713/600 |

FOREIGN PATENT DOCUMENTS

| | | |
|---|---|---|
| 4-302014 | 10/1992 | (JP) . |
| 5-108038A | * 4/1993 | (JP) . |

* cited by examiner

Primary Examiner—Melvin Marcelo
Assistant Examiner—Jasper Kwoh
(74) Attorney, Agent, or Firm—Jones Volentine, L.L.C.

(57) ABSTRACT

A clock signal supplying apparatus of the present invention permits each of sync detectors $11i$ to extract a clock signal $CKi$ and a sync signal $SYNi$ from a cell input data $CIi$ and delivers in synchronism with the sync signal $SYNi$ an input data $DIi$ derived from the cell input data $CIi$. The clock signal $CKi$ is transferred to a master clock generator 12 for generating a master clock MC. The input data $DIi$ is delivered along with the sync signal $SYNi$ to a clock signal supplying circuit $20i$ where it is judged from the first bit of the input data $DIi$ whether the input data $DIi$ is eligible or not. When it is judged yes, the clock signal supplying circuit $20i$ supplies the master clock MC as the clock signal $CLKi$ to a corresponding functional block (S/P converter) $13i$ for a period required for carrying out a given logic operation Accordingly, the clock signal supplying apparatus of the present invention allows the functional blocks which may constitute an ATM switchboard to be supplied with their respective clock signals only when requested, thus minimizing the generation of noise and the energy consumption.

10 Claims, 4 Drawing Sheets

CLOCK SIGNAL SUPPLYING APPARATUS

BACKGROUND OF THE INVENTION

The present invention relates to a clock signal supplying apparatus and particularly, a clock signal supplying apparatus for supplying a clock signal to a plurality of functional blocks in a serial data processing switch system such as a switchboard in asynchronous transfer mode communications (referred to as ATM hereinafter).

As the frequency of a clock signal for electronic devices has sharply been increased for carrying out high-quality high-speed processing, its relevant problems arise including fault action of an electronic device due to clock noise and increase of power consumption For attenuating the noise or minimizing the power consumption, a clock signal control technique is employed in which the functional blocks in an electronic apparatus are supplied with clock signals only when they are carrying out logic operations.

For example, a logic circuit driving apparatus for supplying a clock signal at timing with the action of a functional block is depicted in Japanese Patent Laid-open Publication No. H4-302014. The logic circuit driving apparatus includes functional blocks 1, 2, and 3 for carrying out a series of logic operations, as shown in FIG. 4. The functional block 1 is supplied with an action data signal 4a, starts performing an operation, and delivers an action data signal 4b during the operation. The functional block 2 is responsive to the action data signal 4b for starting a logic operation and releases an action data signal 4c during the logic operation. The action data signal 4c is then supplied to the functional block 3 which in turn starts its logic operation.

The logic circuit driving apparatus also includes a sequence controller 5 to which status data signals 6a, 6b, and 6c are fed from their respective functional blocks 1, 2, and 3. Also, a master clock signal 7 is supplied to the sequence controller 5. In response to the status data signals 6a, 6b, and 6c, the sequence controller 5 produces and delivers action signals 8a, 8b, and 8c, each consisting of a clock signal CLK and other signals, to the functional blocks 1, 2, and 3 respectively. The functional blocks 1, 2, and 3 are also loaded with a common reset signal 9.

In action, when the action data signal 4a is not supplied to the logic circuit driving apparatus, the functional block 1 remains disabled releasing none of the action data signal 4b and the status data signal 6a. Accordingly, the functional block 1 is disabled to receive the action signal 8a thus the clock signal CLK from the sequence controller 5. Equally, the functional blocks 2 and 3 are not supplied with the action data signals 4b and 4c and thus receive none of the clock signal CLK.

Upon receiving the action data signal 4a, the functional block 1 starts with delivering the status data signal 6a to the sequence controller 5. The sequence controller 5 in response to the status data signal 6a releases the action signal 8a to the functional block 1. The functional block 1 receives the clock signal CLK in the action signal 8a and then performs its logic operation. During the logic operation, the functional block 1 delivers the action data signal 4b to the functional block 2. Upon receiving the action data signal 4b, the functional block 2 starts with the same action as of the functional block 1.

In this manner, the functional blocks 1 and 2 supply the succeeding functional blocks 2 and 3 with their respective action data signals 4b and 4c. The functional blocks 1, 2, and 3 excited by the action data signals 4a, 4b, and 4c respectively deliver their respective status data signals 6a, 6b, and 6c to the sequence controller 5 and in turn receive the clock signal CLK from the sequence controller 5 for performing their logic operations.

Such a conventional logic circuit driving apparatus has a disadvantage to be solved. Since the functional block 1 to 3 start operating only when they have been loaded with the action data signals 4a to 4c, they have to be programmed to operate in a time sequence and thus, are hardly suited for any applicable system.

For example, in a specific system such as an ATM switchboard which has to carry out actions in response to received data without using the action data signal 4a, the functional blocks are activated in different orders depending on the received data. The prescribed conventional logic circuit driving apparatus may hardly be utilized for effective control of the clock signal.

SUMMARY OF THE INVENTION

It is a primary object of the present invention to provide a novel, improved clock signal supplying apparatus appropriated for use in a system in which functional blocks are not programmed to operate in a time sequence.

It is another object of the present invention to provide a novel, improved clock signal supplying apparatus for controlling the supply of clock signal in accordance with data to be processed.

It is a further object of the present invention to provide a novel, improved clock signal supplying apparatus for supplying a clock signal to a functional block only when requested thus to eliminate noise from unwanted clock signal and minimize power consumption.

For achievement of the object, the clock signal generating apparatus incorporates a plurality of clock signal generating circuits for receiving an input data of serial mode having at its front an indicator bit indicating that the input data is eligible or not, and supplying clock signals to corresponding functional blocks which are responsive to their respective clock signals for performing logic operations.

The clock signal supplying circuit comprises: a status generating means for receiving the input data assigned to the corresponding functional block along with a sync signal indicative of start timing of the input data, and when it is judged from the indicator bit that the input data is eligible, enabling a status signal for a period required for carrying out the logic operation of the functional block; and a clock controlling means for supplying a master clock signal, which is commonly supplied to the clock signal supplying circuits, as the clock signal to the corresponding functional block while the status signal is being enabled.

The clock signal generating apparatus of the present invention having such an arrangement can be operated in the following manner.

While one of the functional blocks is loaded with e. g. a known cell input data employed in an known ATM communications network, the clock signal supplying circuit assigned to the functional block also receives the cell input data. Simultaneously, the clock signal generating circuit is fed with the sync signal indicative of start timing of the cell input data The status generating means of the clock signal supplying circuit examines the first or indicator bit of the call input data to determine whether the input data is eligible or not. When it is judged that the input data is eligible, the status signal is enabled for a period required for carrying out the logic operation of the functional block.

The status signal is transmitted to the clock controlling means together with the master clock signal which is commonly supplied to all the clock signal supplying circuits. While the status signal is being enabled, the master clock signal is supplied as the clock signal to the functional block.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE INVENTION

A preferred embodiment of the clock signal supplying apparatus according to the present invention will be described in more detail referring to the accompanying drawings.

Figure 1:
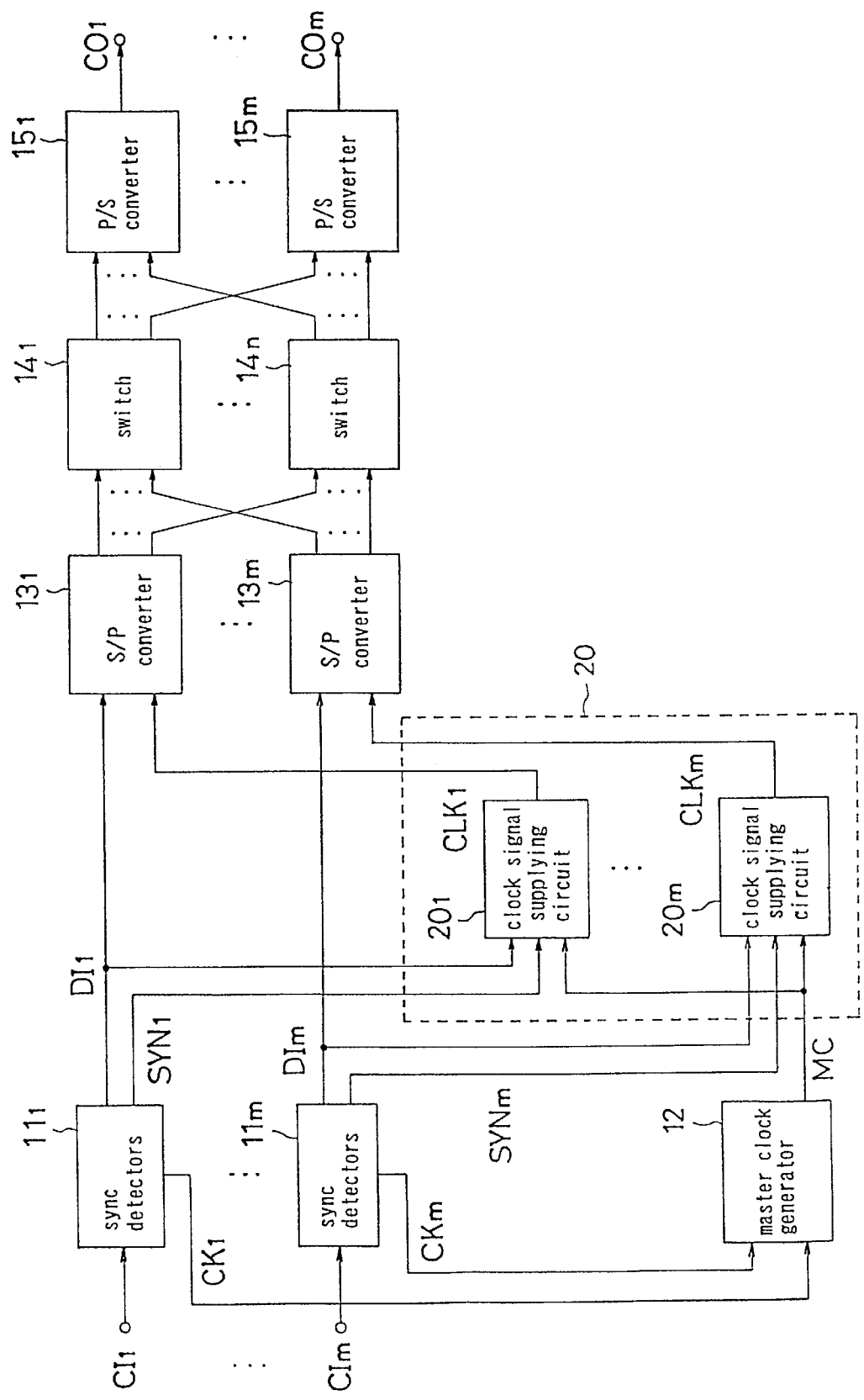
FIG. 1 is a schematic block diagram of an ATM switchboard provided with a clock signal supplying apparatus of the present invention.

FIG. 1 is a schematic block diagram of an ATM switchboard provided with the clock signal supplying apparatus of the present invention.

The ATM switchboard has a plurality of sync detectors $11_1, 11_2, \ldots 11_m$ supplied with cell input data CI1, CI2, ... CIm respectively from corresponding input lines. The cell input data CIi (i being an integer ranging from 1 to m) may comprise a 1-byte control data and a 53-byte serial data (424 bits) of ATM cell format. The 53-byte ATM cell data comprises 5 bytes of a header carrying control information such as the destination of data and 48 bytes of a payload carrying main information to be transmitted to the other end of a communications line. The control data starts with an indicator bit which determines whether the input data is eligible or not. When the input data is eligible, the indicator is expressed by 1. If not, the bit is 0.

The sync detector $11_i$ extracts a clock signal CKi from the cell input data CIi and transmits it to a master clock generator 12. Also, the sync detector $11_i$ upon identifying the indicator bit of the cell input data CIi transmits an input data DIi of the cell input CIi to a corresponding functional block $13_i$ (which may be a serial/parallel converter and referred to as an S/P converter hereinafter) and simultaneously, generates and delivers a sync signal SYNi indicative of start timing of the input data DIi to a corresponding clock signal supplying circuit $20_i$. The sync signal SYNi is a 1-bit pulse signal which is triggered to 1 by the first or indicator bit of the input data DIi and remains 0 in the remaining period.

The master clock generator 12 selects effective one from a group of the clock signals CKi transmitted by the sync detector $11_i$ through identifying a priority level attributed to the input data, and delivers it to the corresponding clock signal supplying circuit as a common master clock signal MC for controlling the ATM switchboard.

The S/P converter $13_i$ is designed for converting the serial input data to parallel signals and connected at its outputs to corresponding inputs of switches $14_1, 14_2, \ldots 14_n$. The switch $14_j$ (j=1 to n) receives (m) input signals at its inputs and distributes them from its outputs to (m) transmission lines.

The outputs of the switch $14_j$ are connected to corresponding parallel/serial converters $15_1, 15_2, \ldots 15_m$ (referred to as P/S converters hereinafter). The P/S converter $15_i$ is designed for converting parallel signals received from their respective transmission lines into a serial signal. The serial signals are released from the P/S converters $15_1, 15_2, \ldots 15_m$ as cell output data CO1, CO2, ... COm respectively.

Meanwhile, the clock signal supplying apparatus 20 is loaded with the input data DIi and the sync signal SYNi from the sync detector $11_i$ and the master clock signal MC from the master clock generator 12. The clock signal supplying apparatus 20 includes identical clock signal supplying circuits $20_1, 20_2, \ldots 20_m$ which are connected to their respective sync detectors $11_1, 11_2, \ldots 11_m$ for receiving the sync signal SYNi along with the input data DIi. In turn, the clock signal supplying circuits $20_1, 20_2, \ldots 20_m$ supply their clock signals CLK1, CLK2, ... CLKm to the corresponding S/P converters $13_1, 13_2, \ldots 13_m$ for a period required for carrying out a given operation.

Figure 2:
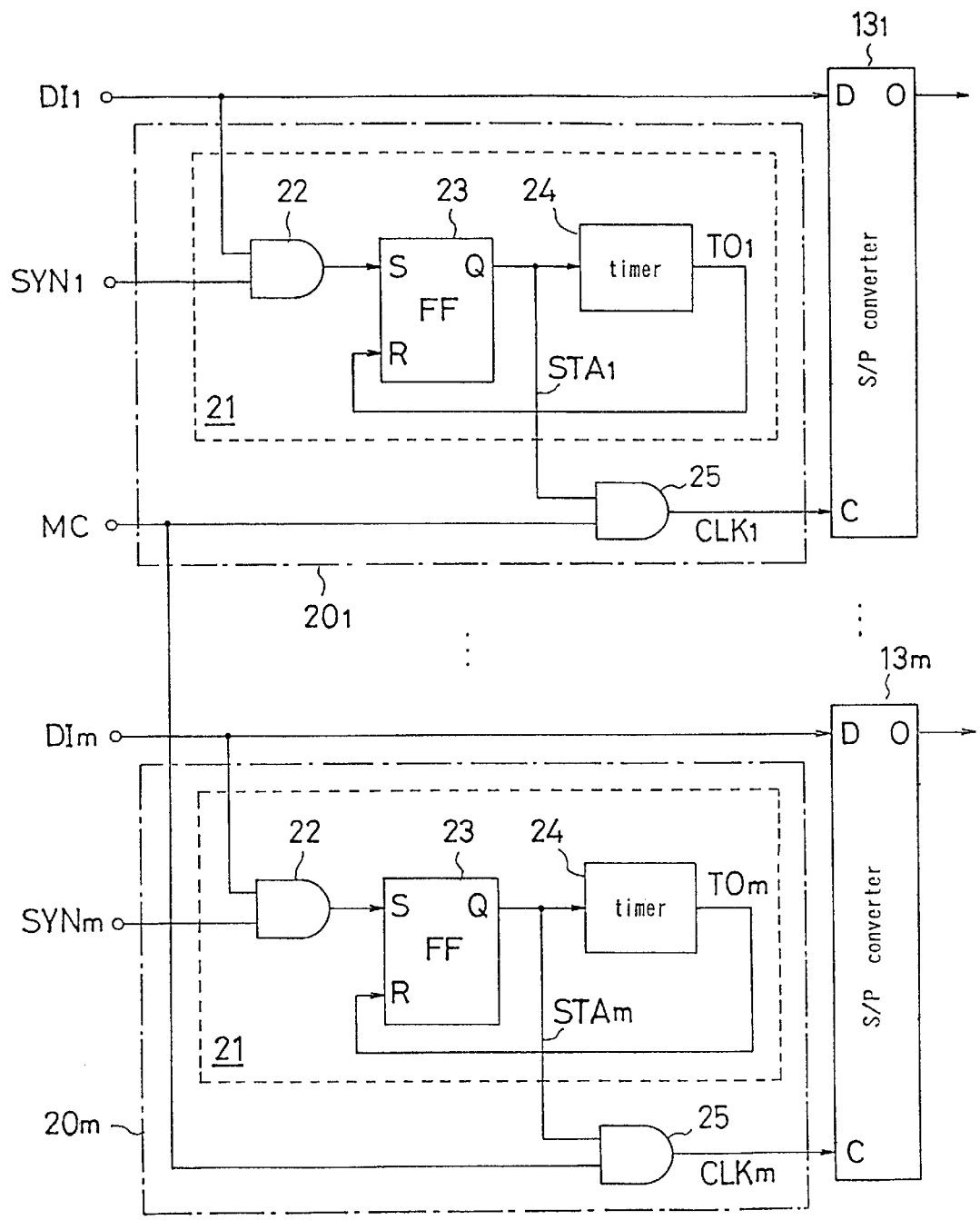
FIG. 2 is a schematic diagram of the clock signal supplying apparatus shown in FIG. 1.

FIG. 2 is a block diagram of the clock signal supplying apparatus 20 shown in FIG. 1.

The clock signal supplying circuits $20_1, 20_2, \ldots 20_m$ in the clock signal supplying apparatus 20 are identical in the construction. The clock signal supplying circuit $20_1$ may comprise a two-input logic gate 22 (referred to as AND), a set/reset type flipflop 23 (referred to as FF), and a timer 24 which constitute a status generating means 21, and a two-input AND 25 which constitutes a clock controlling means.

The input data DI1 is supplied to one of the two inputs of the AND 22 and to the input D of the corresponding functional block or S/P converter $13_1$. The other input of the AND 22 is connected with the sync signal SYN1 indicative of start timing of the input data DI1. The output of the AND 22 is connected to a set input S of the FF 23.

The FF 23 has a reset input R and an output Q in addition to the set input S. When the set input receives an input signal of "1", the output Q delivers an output signal of "1". When the reset input R receivers "0", the output Q releases a "0" signal. The output Q of the FF 23 is further connected to an input of the timer 24. The timer 24 upon receiving the "1" signal starts time counting and when a predetermined length of time has elapsed, delivers a timeout signal TO of a logic value "1" from its output. The output of the timer 24 is connected to the reset input R of the FF 23.

The output Q of the FF 23 is also connected to one of the two inputs of the AND 25. The other input of the AND 25 is supplied with the master clock signal MC. The output of the AND 25 is connected to a clock input C of the S/P converter $13_1$.

Figure 3:
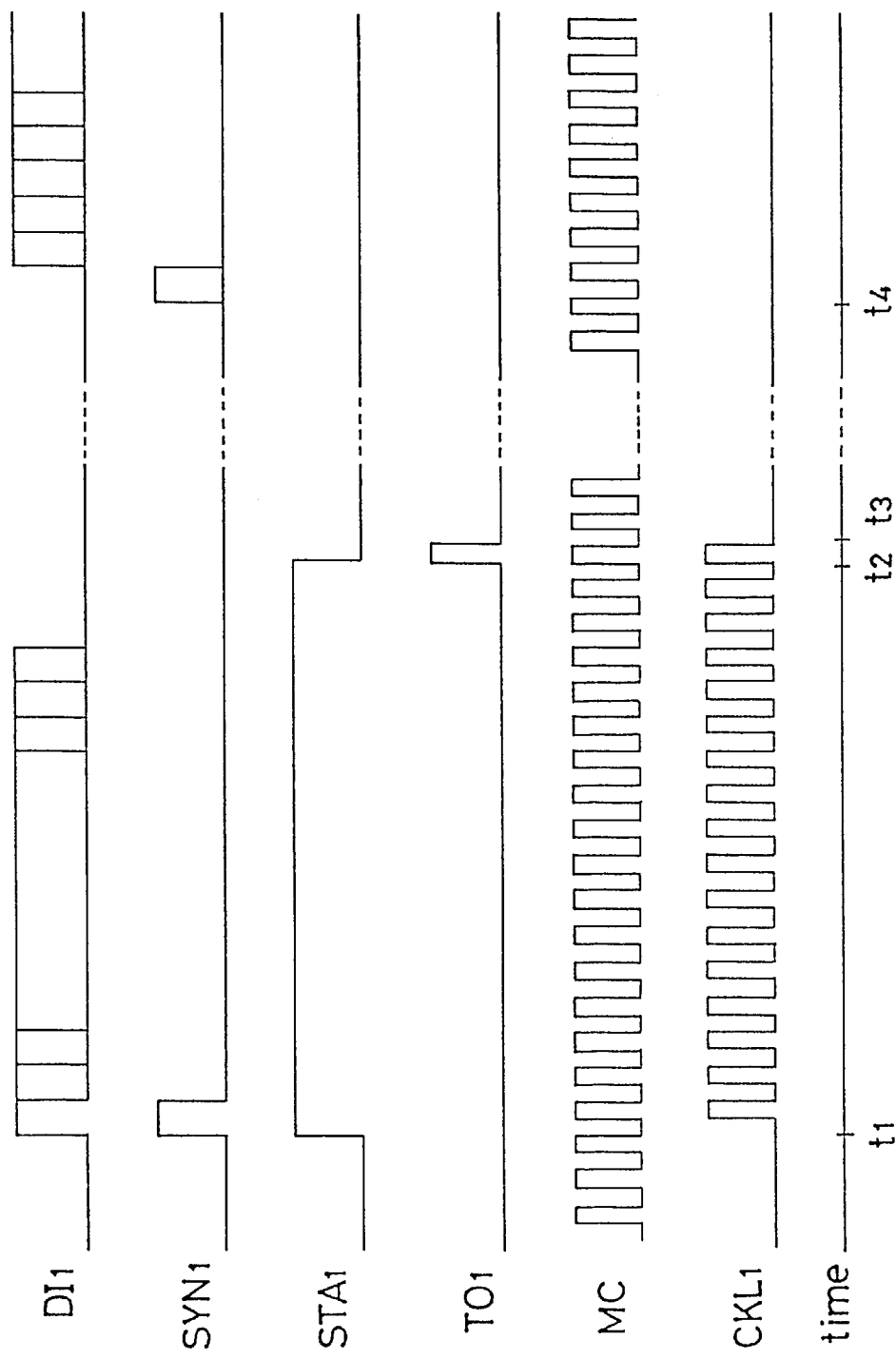
FIG. 3 is a time chart showing actions of the clock signal supplying apparatus of FIG. 2.
Figure 4:
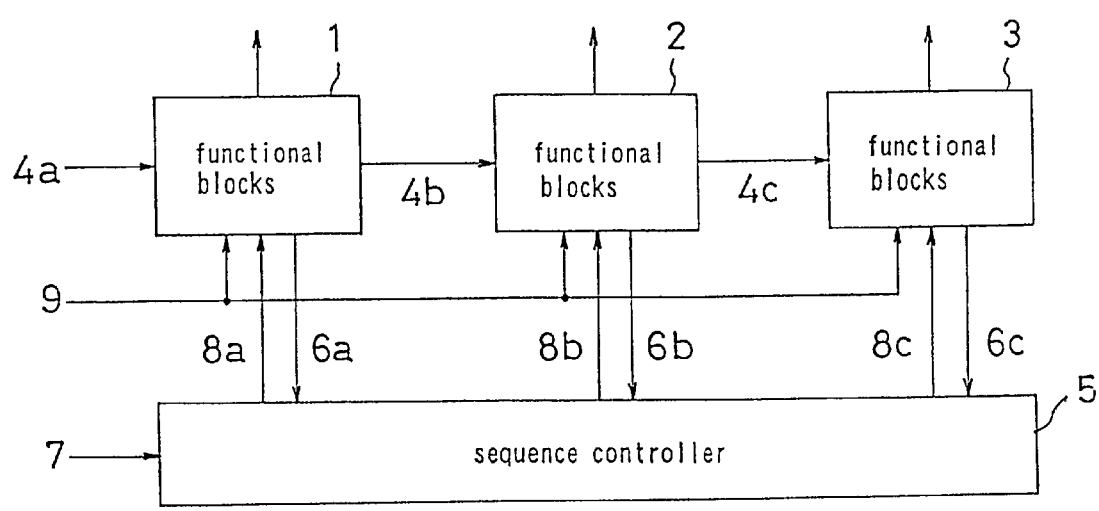
FIG. 4 is a block diagram of a conventional logic circuit driving apparatus.

FIG. 3 is a timing chart showing actions of the clock signal supplying apparatus $20_1$ shown in FIG. 2. The actions of the clock signal supplying apparatus $20_1$ will now be explained referring to FIG. 3.

At time t1 shown in FIG. 3, the input data DI1 and the sync signal SYN1 supplied to the two inputs of the AND 22 are activated to "1". As it is judged that the input data DI1 is eligible, the output signal of the AND 22 turns to "1". This causes the status signal STA1 from the output Q of the FF 23 to rise up to "1". The status signal STA1 of "1" starts the timer 24 and opens the gate of the AND 25. The AND 25 then allows the master clock signal MC to be supplied as the clock signal CLK1 to the clock input C of the S/P converter 131. In response to the clock signal CLK1, the S/P converter 131 starts its logic operation.

The timer 24 triggered at time t1 starts counting and when a predetermined period of time for carrying out the logic operation in the S/P converter 131 has elapsed, releases a timeout signal TO1 of "1".

At time t2, the timeout signal TO1 of "1" resets the FF 23 which in turn shifts its status signal STA1 to "0". As the status signal STA1 is shifted to "0", the AND 25 is closed thus interrupting the supply of the clock signal CLK1 to the S/P converter 131. Also, the status signal STA1 of "0" stops the action of the timer 24. As the output signal of the timer 24 has been turned to "0" at time t3, the operation is returned back to its initial state.

When the input data DI1 is "0", with the sync signal SYNC1 shifted to "1" at time t4, it is judged that the input data DI1 is not eligible and the output signal of the AND 22 is turned to "0". This allows the FF 23 to stay disabled and its status signal STA1 remains "0". Accordingly, the S/P converter 131 is kept disconnected with the clock signal CLK1.

As described, the clock signal supplying circuit 20$i$ of the clock signal supplying apparatus 20 is appropriately controlled for examining whether the input data DIi is eligible or not for each the S/P converter 13$i$ and when it is judged yes, supplying the clock signal CLKi to the S/P converter 13$i$ for a period required for carrying out its logic operation. This prevents the S/P converter 13$i$ or the functional block from receiving unwanted clock signals CLK As the result, the functional block will be reduced in the generation of clock noise and allowed to halt its logic operation when not requested, thus contributing the energy saving of the apparatus.

Although the preferred embodiment of the present invention has been described in the form of a clock signal supplying apparatus, it is not of limitation. It would clearly be understood by those skilled in the art that various changes and modifications are made without departing from the scope of technical features defined in the appended claims as fall within the true spirit and scope of the present invention.

While the embodiment of the clock signal supplying apparatus of the present invention shown in FIG. 1 is described in application to the ATM switchboard, it may be used with equal success in an ATM transmitter. Furthermore, the present invention is applicable to other systems than the ATM system including a synchronous communications network, a packet communications network, and so on.

The status generating means 21 and the clock controlling means 25 are not limited to the circuitry arrangements shown in FIG. 2 but may successfully be implemented by similar operational circuits.

Although the input data DI1 is fed along one signal line to the S/P converter 131 as shown in the block diagram of FIG. 1, it may be supplied in the unit of a byte along eight signal lines. In the latter case, the indicator bit indicative of the eligible or not state of the input data DI1 is assigned to the first bit of one of the eight data segments.

The positive logic circuitry arrangement shown in FIG. 2 may be substituted by an appropriate negative logic circuitry arrangement.

As set forth above, the clock signal supplying apparatus of the present invention comprises the status generating means for examining from the first bit of an input data supplied in serial form whether the input data is eligible or not for each functional block, and when it is judged that the input data is eligible, enabling a status signal for a period required for carrying out its operation, and the clock controlling means for supplying a clock signal to the functional block while the status signal is being enabled. This allows the functional block to receive the clock signal when requested and thus be minimized in the generation of unwanted clock noise and the energy consumption.

The entire disclosure of Japanese Patent Application No. 9-46261 filed on Feb. 28, 1997 including specification, claims, drawings, and summary is incorporated herein by reference in its entirety.

What is claimed is:

1. A clock signal supplying apparatus comprising:
   a plurality of sync detectors supplied with serial input data respectively from corresponding input lines, said sync detectors extracting a clock signal from the serial input data, and said sync detectors generating a sync signal;
   a master clock generator which generates a master clock signal based on the clock signal;
   a plurality of functional blocks, each functional block including a serial/parallel converter; and
   a plurality of clock signal supplying circuits which selectively supply the master clock signal to the serial/parallel block converter of corresponding functional blocks in response to the sync signal.

2. The clock signal supplying apparatus of claim 1, further comprising a status generating unit, responsive to the sync signal, which enables a status signal for a period required for carrying out the logic operation of the functional block.

3. The clock signal supplying apparatus according to claim 2, wherein the input data has at its front an indicator bit indicating that the input data is eligible or not, and the status signal of the status generating unit is enabled when the input data is eligible.

4. The clock signal supplying apparatus according to claim 1, wherein the input data is of a cell format employed in an asynchronous transfer mode communications network, and the functional blocks are logic circuits for carrying out their respective logic operations of a switchboard or transfer device in the asynchronous transfer mode communications network.

5. The clock signal supplying apparatus of claim 1, wherein no clock signal is supplied to an unselected serial/parallel converter.

6. A clock signal supplying apparatus comprising:
   a plurality of functional blocks, each functional block including a serial/parallel converter;
   a plurality of clock signal supplying circuits which correspond each of functional blocks;
   a master clock generator which supplies clock signal to each of the clock signal supplying circuits; and
   a plurality of sync detectors each of which generates and delivers a sync signal to a corresponding clock signal supplying circuit in response to serial input data;
   wherein one of said clock signal supplying circuit is selected based on said serial input data and said selected clock signal supplying circuit supplies the clock signal to a serial/parallel converter of a corresponding functional block of said plurality of functional blocks in response to said sync signal.

7. The clock signal supplying apparatus of claim 6, further comprising a status generating unit, responsive to the sync signal, which enables a status signal for a period required for carrying out the logic operation of the functional block.

8. The clock signal supplying apparatus according to claim 7, wherein the input data has at its front an indicator bit indicating that the input data is eligible or not, and the status signal of the status generating unit is enabled when the input data is eligible.

9. The clock signal supplying apparatus according to claim 6, wherein the input data is of a cell format employed in an asynchronous transfer mode communications network, and the functional blocks are logic circuits for carrying out their respective logic operations of a switchboard or transfer device in the asynchronous transfer mode communications network.

10. The clock signal supplying apparatus of claim 6, wherein no clock signal is supplied to an unselected serial/parallel converter.

* * * * *